July 4, 1950 E. W. ENGSTROM ET AL 2,514,043

COLOR TELEVISION

Filed Jan. 3, 1946 2 Sheets-Sheet 1

INVENTORS
Elmer W. Engstrom
& George C. Sziklai
BY H. S. Grover
ATTORNEY

INVENTORS
Elmer W. Engstrom
& George C. Sziklai
BY
H. S. Grover.
ATTORNEY

Patented July 4, 1950 2,514,043

UNITED STATES PATENT OFFICE 2,514,043

COLOR TELEVISION

Elmer W. Engstrom and George C. Sziklai, Princeton, N. J., assignors to Radio Corporation of America, a corporation of Delaware Application January 3, 1946, Serial No. 638,781

7 Claims. (Cl. 178—5.4)

This invention relates to sequential color television and more particularly, although not necessarily exclusively, to a novel method of and means for operating in combination with a scanning system or device to maintain color separation. The scanning system or device may be of the usual type and may operate electronically; optically, as for example, by mirrors movable to deflect a light beam along a scanning path; or mechanically. The color separation method and means of this invention may operate in conjunction with an image signal generating system or an image producing device. For these reasons, while the invention is disclosed illustratively as operating in conjunction with an electronic image producing scanner of the cathode ray tube variety, it will be understood that the invention is not so limited.

The color separation method of the invention depends upon the utilization in a novel manner of light polarization in a given plane in conjunction with a selecting element or device, the plane of polarization of which may be changed in accordance with the building up of a scanning pattern. Utilization of three planes of polarzation is disclosed herein, but it will be understood that a greater or lesser number of planes of polarization may be present in the light path depending upon the number of primary colors into which an image, view, or the like is to be analyzed and an image produced or created by synthesizing the separated primary colors.

The principal aim of the invention is to provide a novel method of and means for analyzing or synthesizing an image or view in accordance with a plurality of the primary colors into which its shades or hues may be analyzed.

Another object of the invention is to provide a novel color separation filter combination the plane of polarization of which may be changed selectively. A closely related object is to change the plane of polarization or planes of polarization progressively.

A further object resides in the provision of a simple and small rotating filter which transmits different colors sequentially from an illuminated or luminous image.

A still further object resides in the provision of a rotating color filter the dimensions of which are substantially coextensive with the image field with which it is associated.

A still further object is that of arranging a novel method of providing for sequential color filtering from an image source having the property of light persistence.

A further object is to provide a novel component color separation filter system which accomplishes selective filtering by light polarization.

A still further object is to provide a novel arrangement for operating the movable member of a component color separation filter system.

Other objects and advantages of the present invention will, of course, become apparent and immediately suggest themselves to those skilled in the art to which the invention is directed from a reading of the following specification in connection with the accompanying drawings in which.

Figure 5:
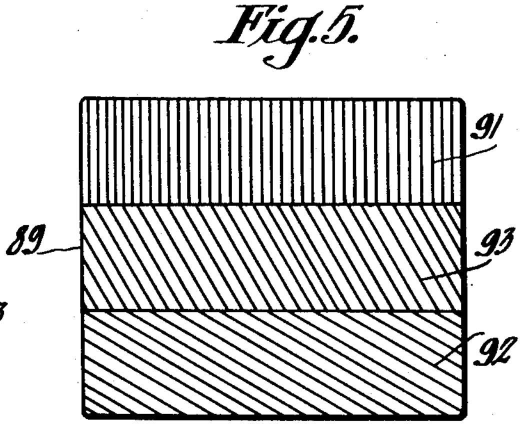

Fig. 5 of the drawings illustrates the structure of a modified analyzer; and

Figure 6:
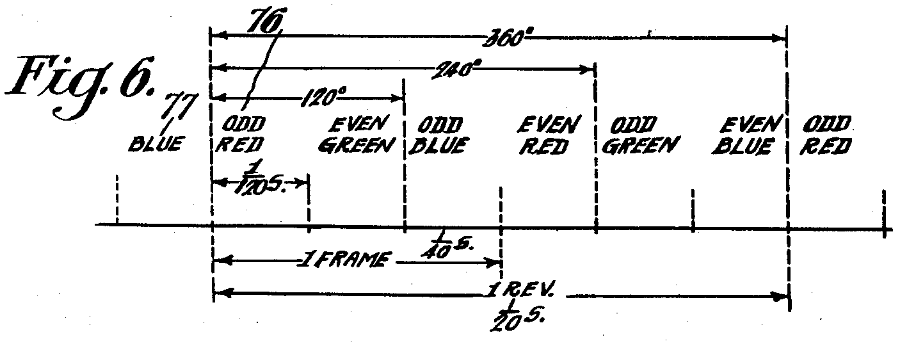

Fig. 6 is a diagram of the time relationship of the television image production rate in a typical color system selected as an example to illustrate use of the invention.

Figures 1, 2:
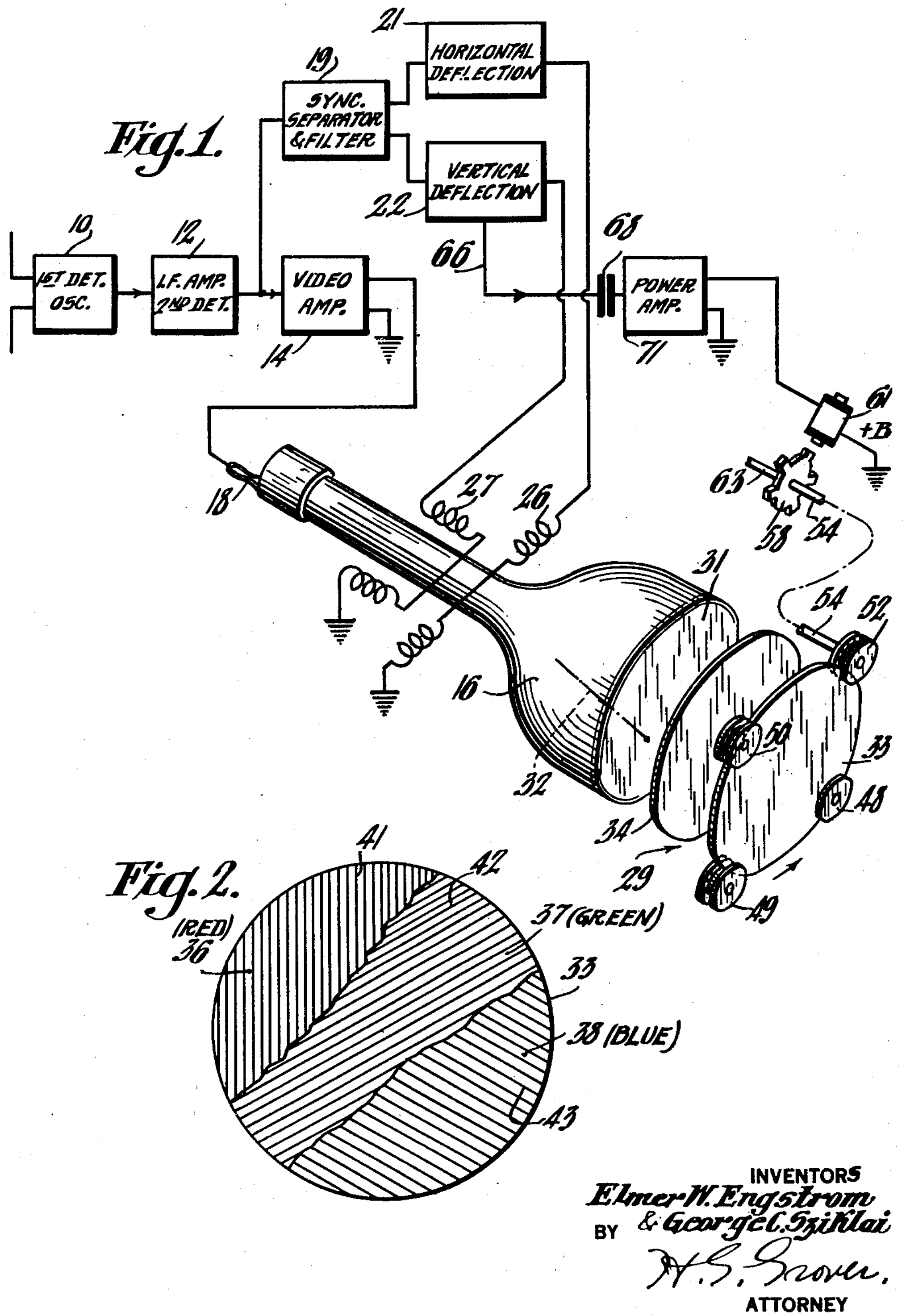
Fig. 1 shows schematically a television receiver embodying the invention.
Fig. 2 is a view in elevation of a polarized filter embodying the invention.

Referring to Fig. 1, a television receiver is shown schematically which is of the well known type comprising a first detector and a tunable oscillator indicated at 10, an intermediate frequency amplifier together with a second detector indicated at 12, a video amplifier 14, and an image producing device such as a cathode ray tube 16. The output signals of the video amplifier are supplied in the usual manner to the cathode ray tube 16, a terminal 18 of which is shown illustratively and schematically, and it will be understood that means are present for providing the usual biasing voltages for the several elements of this tube. The receiver is designed for the reception of the usual composite signal comprising image signals and horizontal and vertical sync pulses, a horizontal sync pulse following each scanning line or trace, and a vertical sync pulse occurring at the end of each vertical field and/or frame deflection.

This composite signal is applied both to the cathode ray tube 16 and to a suitable sync pulse separating and filtering circuit indicated at 19. Usual and well known blanking methods (not shown) cause the tube 16 to respond only to the video or image signals. Horizontal sync pulses are supplied from the separating and filtering circuit 19 to a horizontal deflecting circuit 21, and vertical sync pulses are supplied to a vertical deflecting circuit 22. These deflecting circuits provide the usual oscillator triggering pulses and current waves of sawtooth shape in the horizontal and vertical deflecting coils 26 and 27, respectively.

A color filter device, indicated in its entirety by reference character 29, is positioned so that it filters the light emitted by an image produced on the luminescent screen or target 31 scanned by a cathode ray beam 32 moving to produce a predetermined scanning pattern or raster under control of deflecting currents in the coils 26 and 27. The scanning pattern or raster which is coextensive with the produced image is, in general, rectangular. In the tricolor system of color television selected by way of example, the primary or component colors are red, green and blue for an additive color system, and they are exposed in a consistent predetermined sequence. In the illustrative example to be described herein, the exposure sequence may be regarded as being in the order named, although other orders may be selected when desired. It will be understood that the choice of primary or component colors and exposure sequence of the colors will depend entirely upon the color system selected for incorporation in the television transmitting equipment. The equipment for sequential scanning of the original view or image in different colors is not disclosed herein, but it will be understood that any system of scanning may be employed for developing a series of video or image signals to be applied at receiving points to an appropriate electrode or electrodes of the tube 16 in timed relationship to the effective color filtering conditions of the device 29 which is before the target area 31 or the target or mosaic area of the camera tube of a transmitter.

An arrangement for effecting television scanning at the transmitter end of a tricolor system wherein a storage type of cathode ray television camera tube is used to resolve the light image into signals for transmission is shown in Patent No. 2,297,524, granted to E. I. Anderson on September 29, 1942, while another preferred form has been shown by the United States application of Otto H. Schade, Serial No. 376,770, filed January 31, 1941, now Patent No. 2,458,649, granted January 11, 1949, either of which may be regarded as illustrative of one form of transmitter system. It will be understood that the device 29 of the invention to be described in detail may be applied at the transmitter if color filter effects are to be interposed in the light path which includes the target area of the camera tube.

The filter device 29 of this invention comprises a multicolor polarized filter member 33 and a polarizing analyzer 34. One of the members 33 or 34 is moved with respect to the other so that the color transmission of the system is changed sequentially. Preferably, for a reason to be explained hereinafter, the relative movement is such that the color transmission of the system changes progressively from top to bottom where scanning progresses from top to bottom of the raster in the usual manner.

In connection with television receiving systems which employ an image producing tube having light image persistence, such as a cathode ray tube, progressive color change is desired. However, from what is to follow, it will be clear that the invention may be used in such a way that light of successive colors over the whole field and of any desired order may be transmitted. Also, it is within the scope of the invention to filter light from any source other than that employed for providing an illuminated or luminous image.

Figure 3:
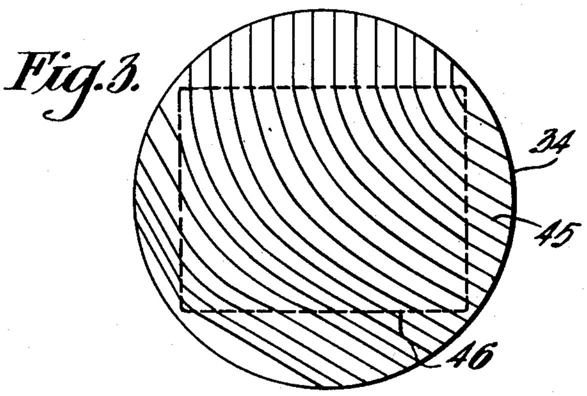
Fig. 3 is an analyzer constructed in accordance with the invention to cooperate with the filter of Fig. 2.

The polarized filter member 33 and the polarized analyzer 34 are shown more in detail in Figs. 2 and 3, respectively, of the drawing. Referring to Fig. 2, the illustrative example is in the form of a disc so that it may be readily rotated. However, it will be understood that it may be of any desired shape in outline, for example square or rectangular, the form it assumes being governed more or less by conditions of use.

For the color television use of the illustrative example of Fig. 1, the member 33 is constructed of three laminations 36, 37, and 38. Each lamination is designed to facilitate transmission of light of a given color in conjunction with the polarized analyzer 34 of Fig. 3. To accomplish this purpose, each lamination is composed of or contains dichroic crystals which are aligned so as to produce a definite plane of polarization. For example, the lines 41, 42, and 43 are indicative of or may be planes of polarization. The sole purpose of these more or less imaginary lines is to facilitate the description of the operation of the invention generally, and more particularly when the invention is applied as shown in Fig. 1, to obtain color separation in a television system at the transmitter or receiver.

Each lamination is prepared in any manner so as to transmit light of a given color. For example, the lamination 36 is colored or dyed red, the lamination 37 is colored or dyed green, and the lamination 38 is colored or dyed blue. The lines 41, 42, and 43 are rotated 120° with respect to each other in the illustrative example. Each of the laminations passes all planes of polarization of its nominal color and also passes the other colors having a single plane of polarization.

The polarized analyzer 34 likewise is composed of or contains dichroic crystals which are aligned so as to provide a definite plane of polarization of transmitted light. The lines 45 are indicative of the direction of the plane of polarization of the member 34, and it will be noted that these lines are curved indicating that the dichroic crystals are aligned as shown. The outline of the raster or image which is to be viewed or which is formed by optical means in the general plane of the device 29 is indicated by reference character 46. Since, as stated above, a simultaneous change of color transmission over the whole area of the raster 46 would make both the end of the scanning field, which, in the normal scanning of the raster pattern would be the bottom of the field, and the beginning or top of the following field appear to be of the same color because of image persistence or afterglow. In order that luminous portions of simultaneously existing or simultaneously visible fields or frames may appear in their desired color, the lines 45 are curved so that the color transmission will correspond to the field or frame being scanned. The analyzer 34 may be a portion of a circularly polarized sheet of a commercially available material, known as "Polaroid."

The analyzer 34 is superimposed on the polarized color filter 33 as shown in Fig. 1. For example, with the direction of the lines 45 coinciding with the red polarization of the filter member 33 at the top of the raster 46 and with these lines in coincidence with the blue polarization on the bottom of the member 33, the orientation of the lines 45 in the middle of the member 33 assume an angle between the angle for red and the angle for blue. White light transmitted by the device 29 when the filter 33 is orientated in this manner will appear red on top, dark purplish in the middle, and blue on the bottom. If the color filter 33 is rotated counter-clockwise or if the analyzer 34 is rotated clockwise, at the stage of this relative movement the red polarization of the filter 33 will coincide with the polarization of the analyzer 34 at a lower level, and the blue polarization 43 will not coincide with the analyzer on any portion of the latter. When the color filter 33 is turned through 60°, the green polarization 42 of the color filter is coincident with the lines 45 at the top of the analyzer, and the red polarization 41 is coincident with the lines 45 at the bottom of the analyzer. After another 60° rotation, the blue polarization 43 of the filter will be so oriented with respect to the orientation lines of the analyzer 45, that blue will be transmitted at the top and green at the bottom. Thus, after 180° of rotation, all three colors are transmitted in such a manner that color transmission is swept from top to bottom of the raster, thus following the usual scanning sequence of a television image. For 360° of rotation, two color frames are scanned in the illustrative example.

As shown in Fig. 1, the organization of the parts of the device 29 is such that the color filter 33 is rotatable, and it is supported for rotation by grooved idler rollers 48, 49, and 50. One or more of these rollers may be and preferably is supported so that it may be moved substantially radially to permit installation and release of the filter 33. The filter may be driven for rotation by a drive roller 52 which is or may be similar to the guide rollers 48 to 50. A drive shaft 54 for the roller 52 is suitably disposed so that drive mechanism connected therewith will clear the tube 16 and/or other parts of the equipment associated with this tube. The shaft 54 carries the rotor 58 of a phonic-wheel motor having a stator 61 shown for convenience as being in the form of an electromagnet. The extension 63 of the shaft 54 is or may be driven from a suitable motor (not shown) which preferably has a reasonably constant speed characteristic. The coil of the stator 61 is connected to an appropriate part of the vertical deflection circuit 22, for example to the blocking oscillator (not shown) therein. This connection is made by way of a lead or conductor 66 and a coupling condenser 68 to a power amplifier 71, the output of which is connected as shown to the stator 61 or coupled thereto by a transformer (not shown) if desired.

The rotatable member of the device 29, for example the member 33, may be provided with a magnetic ring or band, provided with teeth or hardened so as to produce the magnetic equivalent of teeth, and the member so modified may be exposed to the field produced by the stator 61. In this manner the mechanical load of the rotatable device 33 on the shaft 54 would be lessened somewhat and only the angular velocity regulating frictional load will appear at the roller 52.

Operation of the system of Fig. 1 will be explained by way of example in connection with Fig. 6 which shows the timing cycle for an interlaced color television sequence. It will be understood, however, that the timing cycle may be anything desired which is suitable for the production of television signals and/or the exhibiting of color images under control of the produced signals.

In general, television images are produced at a given rate, the frequency of which is a submultiple of the ordinary power line frequencies. The generally adopted power frequency is 60 cycles, and the television image frequency is 30 cycles. To avoid flicker, interlaced scanning is practiced with a field frequency of 60 cycles. Color television systems in general conform to this timing scheme with such modifications as are necessary by reason of the multiple exposure or multiple scanning of the original view or image. For example, a typical timing cycle for production of color television images is indicated in the timing chart of Fig. 6 in which the field times are indicated as being alternately odd and even, and the primary color which is visible during each field exposure or scanning is indicated. Referring to the description above, it was stated that a transmission condition for a given color progress from the top of the device 29 to the bottom. Considering the frame 76, scansion with a red filter orientation will start at the beginning of this frame, and 1/120 of a second later, the scansion will be completed. However, at this time and with an image tube 16 having considerable light persistence or after-glow, the previously scanned field 77 will cause some luminosity to remain at the bottom of the raster 46. The blue component of this remnant luminosity will be transmitted. As scanning of the field 76 proceeds, the red transmitting alignment of the members 33 and 34 will progress downwardly. When the red transmitting alignment reaches the bottom of the raster 46, the green transmitting alignment will occur at the top of the raster since the green light component is to be transmitted during scanning of the next field. The angle through which the filter member turns is indicated on the time chart of Fig. 6 as well as the frame time and the time occupied for one revolution of the filter member. It will be seen that the filter member for the illustrative timing cycle is 1200 R. P. M., but it will be understood that the speed of rotation will be suited in all cases to the use of the invention and/or the timing cycle employed.

Figure 4:
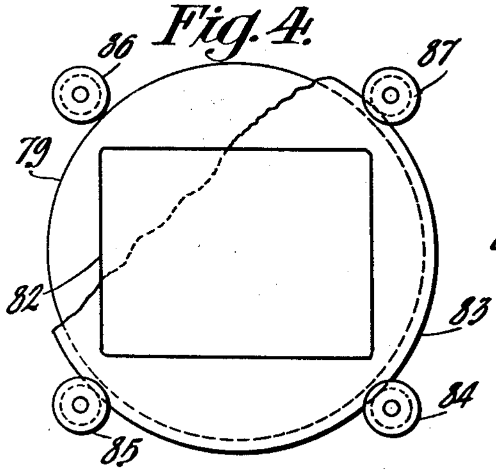
Fig. 4 shows a slight modification of the arrangement of Fig. 1.

Fig. 4 of the drawings discloses a slight modification of the arrangement of the parts shown in Fig. 1. The outline of the end of a cathode ray tube or the like for producing images is indicated by reference character 79. A polarized analyzer 82 which is or may be similar to the analyzer 34 of Fig. 3 is of the general shape and outline of the desired raster or viewing area and is positioned on or very close to the end 79 of the cathode ray tube. This analyzer 82 may be supported in any suitable manner as for example by a mask or the like (not shown) or by a portion of a cabinet housing the cathode ray tube. A polarized color filter disc 83 of the invention is supported on its rim by a plurality of rollers 84 to 87. One or more of these rollers may be driven so as to cause rotation of the filter member 83 as shown in Fig. 1 of the drawings. The purpose of the arrangement of the parts in Fig. 4, it is believed, will be obvious from the foregoing description of the arrangement of Fig. 1.

Fig. 5 of the drawings shows a polarized analyzer in a still further modified form. This form of analyzer 89 is constructed from a plurality of strips of plane polarizing sheets. In the example shown, the analyzer 89 is made up of three strips with the top being vertically polarized, as indicated by the lines 91, and the bottom having the polarization thereof oriented 120° from the top, as indicated by the lines 92. The polarization in the central slip is inclined with respect to the top slip but to a lesser degree than the bottom slip as indicated by the lines 93.

Having now described the invention, what is claimed and desired to be secured by Letters Patent is the following:

1. A color television system employing an image producing device and means for providing said device with a plurality of series of image signals, each series of signals representing light values of component colors of a view or object, a color filter interposed in the light path of said image producing device comprising a light polarizing member having the plane of polarization arranged on curved lines the final direction of said lines making an angle of 120° with respect to their original direction, a filter member cooperating with said light polarizing member, said filter member being composed of light transmitting parts, each part selectively transmitting light of a distinct color and in a given plane of polarization, and means to produce relative movement between said members, means whereby the planes of polarization of said light polarizing member are selectively brought into coincidence with a given plane of polarization of said filter member.

2. A color television system employing an image producing device and means for providing said device with a plurality of series of image signals, each series of signals representing light values of component colors of a view or object, a color filter interposed in the light path of said image producing device comprising a light polarizing member having the plane of polarization arranged on curved lines the final direction of said lines making an angle of 120° with respect to their original direction, a filter member cooperating with said light polarizing member, said filter member being composed of light transmitting parts, each part selectively transmitting light of a distinct color and in a given plane of polarization, and means to produce relative movement between said members, means whereby the planes of polarization of said light polarizing member are selectively and progressively brought into coincidence with a given plane of polarization of said filter member.

3. Color television apparatus comprising a cathode ray tube having a target area, scanning means associated with said tube to scan said target area successively and cyclically in accordance with fields representing selected colors, a light filter device interposed in a light path which includes the target area of said tube, said light filter device having polarized light modifying means with its plane of polarization arranged on curved lines, a complementary movable polarized filter member composed of a plurality of differently polarized and differently colored elements, and means for operating said movable member in such timed relationship with successive scannings of said target area to pass light of different colors representing successive fields.

4. The combination in a color television receiver of a cathode ray tube having a fluorescent screen area, scanning means associated with said tube to scan said screen successively and cyclically in accordance with fields representing selected colors, a light filter device comprising a stationary variably polarized analyzer, a rotary filter member polarized in a plurality of planes and transmitting light of a distinctive color for each plane of polarization, and means for moving said rotary filter member with respect to said stationary polarized analyzer in such timed relationship with successive scannings of said target area to pass light of different colors representing successive fields.

5. The combination in a color television receiver of a cathode ray tube having a fluorescent screen area, scanning means associated with said tube to scan said screen successively and cyclically, a light filter device comprising a polarized analyzer and a rotary filter member polarized in a plurality of planes and means whereby such filter member transmits light of a distinctive color for each plane of polarization, said device being positioned in front of said fluorescent screen area to pass light emitted therefrom, means for moving said rotary filter member and said stationary polarized analyzer with respect to each other, and means for synchronizing said last named means with the operation of said scanning means.

6. A color television system employing an image producing device having an image persistence characteristic and means for providing said device with a plurality of series of image signals, each series of signals representing light values of component colors of a view or object, a color filter to be interposed in the light path of said image producing device comprising a light polarizing member variably polarized, a colored polarized filter member composed of a plurality of differently polarized and differently colored elements to cooperate with said light polarizing member, and means to move said polarized filter member with respect to said light polarizing member at a rate such that a differently colored filter combination is effectively positioned in the light path of said image producing device for each successive image as it is progressively produced thereby to impart a desired color to the image.

7. Color television apparatus comprising a device having a light source for producing luminous images representing selected colors successively and cyclically, a light filter device interposed in a light path originating with the light source of said image producing device, said light filter device having a movable colored polarized light modifying means composed of a plurality of differently colored overlapping elements, a light polarizing member variably polarized, and means for operating said movable means in such timed relationship with the successive productions of luminous images by said image producing device to pass light of different colors representing successive luminous images.

ELMER W. ENGSTROM.
GEORGE C. SZIKLAI.

REFERENCES CITED

The following references are of record in the file of this patent:

UNITED STATES PATENTS

| Number | Name | Date |
|---|---|---|
| 2,109,540 | Leisman | Mar. 1, 1938 |
| 2,184,999 | Land | Dec. 26, 1939 |
| 2,263,684 | Ryan | Nov. 25, 1941 |
| 2,297,524 | Anderson | Sept. 29, 1942 |
| 2,301,254 | Carnahan | Nov. 10, 1942 |
| 2,328,219 | Land | Aug. 31, 1943 |
| 2,350,892 | Hewson | June 6, 1944 |